United States Patent
Lowe et al.

(10) Patent No.: US 9,527,132 B2
(45) Date of Patent: Dec. 27, 2016

(54) DAMPED PART WITH INSERT

(75) Inventors: Brent D. Lowe, Milford, MI (US);
Mark T. Riefe, Brighton, MI (US);
Omar S. Dessouki, Beverly Hills, MI (US); Mohan Sundar, Troy, MI (US);
Kevin M. Thompson, Marshall, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2603 days.

(21) Appl. No.: 12/174,320

(22) Filed: Jul. 16, 2008

(65) Prior Publication Data

US 2009/0071779 A1 Mar. 19, 2009

Related U.S. Application Data

(60) Provisional application No. 60/951,031, filed on Jul. 20, 2007.

(51) Int. Cl.
| | |
|---|---|
| *F16F 7/00* | (2006.01) |
| *B22D 19/00* | (2006.01) |
| *B60T 5/00* | (2006.01) |
| *F16D 65/00* | (2006.01) |
| *F16D 65/12* | (2006.01) |
| *F16F 7/06* | (2006.01) |
| *F16D 65/02* | (2006.01) |

(52) U.S. Cl.
CPC .............. *B22D 19/0054* (2013.01); *B60T 5/00* (2013.01); *F16D 65/0006* (2013.01); *F16D 65/12* (2013.01); *F16F 7/06* (2013.01); *F16D 2065/1328* (2013.01)

(58) Field of Classification Search
USPC ................. 188/381, 218 A, 218 R, 218 XL,188/73.36–73.37, 251 M, 378, 73.35, 268, 18 A; 164/100

IPC ....................................................... F16D 65/12
See application file for complete search history.

(56) References Cited

U.S. PATENT DOCUMENTS

| | | |
|---|---|---|
| 974,024 A | 10/1910 | Carter |
| 1,484,421 A | 2/1924 | Thomspon |
| 1,989,211 A | 1/1935 | Norton |
| 2,012,838 A | 8/1935 | Tilden |
| 2,026,878 A | 1/1936 | Farr |

(Continued)

FOREIGN PATENT DOCUMENTS

| | | |
|---|---|---|
| CH | 428319 A | 1/1967 |
| CN | 2005/10113784 | 10/2005 |

(Continued)

OTHER PUBLICATIONS

International Search Report dated Apr. 2, 2007 for International Application No. PCT US06/29687, Publication No. WO 2007/040768; GM Global Technology Operations, Inc.

(Continued)

*Primary Examiner* — Robert A Siconolfi
*Assistant Examiner* — San Aung
(74) *Attorney, Agent, or Firm* — BrooksGroup (57) ABSTRACT

One embodiment of the invention may include a product including a body portion including a first face and a frictional damping insert overlying the first face of the body portion. The body portion may include a second face overlying the insert. The insert may have a throughhole and a portion of the body portion may extend from the first face through the throughhole and the insert to the second face of the body portion.

23 Claims, 4 Drawing Sheets

(56) References Cited

U.S. PATENT DOCUMENTS

| | | | |
|---|---|---|---|
| 2,288,438 | A | 6/1942 | Dach |
| 2,603,316 | A | 7/1952 | Pierce |
| 2,978,793 | A | 4/1961 | Lamson et al. |
| 3,085,391 | A | 4/1963 | Hatfield et al. |
| 3,127,959 | A | 4/1964 | Wengrowski |
| 3,147,828 | A | 9/1964 | Hunsaker |
| 3,292,746 | A | 12/1966 | Robinette |
| 3,378,115 | A | 4/1968 | Stephens, III |
| 3,425,523 | A | 2/1969 | Robinette |
| 3,509,973 | A | 5/1970 | Kimata |
| 3,575,270 | A | 4/1971 | Wagenfuhrer et al. |
| 3,774,472 | A | 11/1973 | Mitchell |
| 3,841,448 | A | 10/1974 | Norton, Jr. |
| 3,975,894 | A | 8/1976 | Suzuki |
| 4,049,085 | A | 9/1977 | Blunier |
| 4,072,219 | A | 2/1978 | Hahm et al. |
| 4,195,713 | A | 4/1980 | Hagbjer et al. |
| 4,250,950 | A | 2/1981 | Buxmann et al. |
| 4,278,153 | A | 7/1981 | Venkatu |
| 4,338,758 | A | 7/1982 | Hagbjer |
| 4,379,501 | A | 4/1983 | Hagiwara et al. |
| 4,475,634 | A | 10/1984 | Flaim et al. |
| 4,523,666 | A | 6/1985 | Murray |
| 4,529,079 | A | 7/1985 | Albertson |
| 4,905,299 | A | 2/1990 | Ferraiuolo et al. |
| 5,004,078 | A | 4/1991 | Oono et al. |
| 5,025,547 | A | 6/1991 | Sheu et al. |
| 5,083,643 | A | 1/1992 | Hummel et al. |
| 5,115,891 | A | 5/1992 | Raitzer et al. |
| 5,139,117 | A | 8/1992 | Melinat |
| 5,143,184 | A | 9/1992 | Snyder et al. |
| 5,183,632 | A | 2/1993 | Kluchi et al. |
| 5,184,663 | A | 2/1993 | Oono |
| 5,259,486 | A | 11/1993 | Deane |
| 5,310,025 | A | 5/1994 | Anderson |
| 5,416,962 | A | 5/1995 | Passarella |
| 5,417,313 | A | 5/1995 | Matsuzaki et al. |
| 5,509,510 | A | 4/1996 | Ihm |
| 5,530,213 | A | 6/1996 | Hartsock et al. |
| 5,582,231 | A | 12/1996 | Siak et al. |
| 5,620,042 | A | 4/1997 | Ihm |
| 5,660,251 | A | 8/1997 | Nishizawa et al. |
| 5,789,066 | A | 8/1998 | DeMare et al. |
| 5,819,882 | A | 10/1998 | Reynolds et al. |
| 5,855,257 | A | 1/1999 | Wickert et al. |
| 5,862,892 | A | 1/1999 | Conley |
| 5,878,843 | A | 3/1999 | Saum |
| 5,927,447 | A | 7/1999 | Dickerson |
| 5,965,249 | A | 10/1999 | Sutton et al. |
| 6,032,769 | A * | 3/2000 | Daudi ............... F16D 65/0006 188/218 R |
| 6,047,794 | A | 4/2000 | Nishizawa |
| 6,073,735 | A | 6/2000 | Botsch et al. |
| 6,112,865 | A | 9/2000 | Wickert et al. |
| 6,206,150 | B1 | 3/2001 | Hill |
| 6,216,827 | B1 | 4/2001 | Ichiba et al. |
| 6,223,866 | B1 | 5/2001 | Giacomazza |
| 6,231,456 | B1 | 5/2001 | Rennie et al. |
| 6,241,055 | B1 * | 6/2001 | Daudi ............... F16D 65/0006 188/218 XL |
| 6,241,056 | B1 | 6/2001 | Cullen et al. |
| 6,283,258 | B1 | 9/2001 | Chen et al. |
| 6,302,246 | B1 | 10/2001 | Naumann et al. |
| 6,357,557 | B1 | 3/2002 | DiPonio |
| 6,405,839 | B1 | 6/2002 | Ballinger et al. |
| 6,465,110 | B1 | 10/2002 | Boss et al. |
| 6,481,545 | B1 | 11/2002 | Yano et al. |
| 6,505,716 | B1 | 1/2003 | Daudi et al. |
| 6,507,716 | B2 | 1/2003 | Nomura et al. |
| 6,543,518 | B1 | 4/2003 | Bend et al. |
| 6,648,055 | B1 | 11/2003 | Haug et al. |
| 6,799,664 | B1 | 10/2004 | Connolly |
| 6,880,681 | B2 | 4/2005 | Koizumi et al. |
| 6,890,218 | B2 | 5/2005 | Patwardhan et al. |
| 6,899,158 | B2 | 5/2005 | Matuura et al. |
| 6,932,917 | B2 | 8/2005 | Golden et al. |
| 6,945,309 | B2 | 9/2005 | Frait et al. |
| 7,066,235 | B2 | 6/2006 | Huang |
| 7,112,749 | B2 | 9/2006 | DiPaola et al. |
| 7,178,795 | B2 | 2/2007 | Huprikar et al. |
| 7,293,755 | B2 | 11/2007 | Miyahara et al. |
| 7,594,568 | B2 | 9/2009 | Hanna et al. |
| 7,604,098 | B2 | 10/2009 | Dessouki et al. |
| 7,644,750 | B2 | 1/2010 | Schroth et al. |
| 7,775,332 | B2 | 8/2010 | Hanna et al. |
| 7,836,938 | B2 | 11/2010 | Agarwal et al. |
| 2002/0084156 | A1 | 7/2002 | Ballinger et al. |
| 2002/0104721 | A1 | 8/2002 | Schaus et al. |
| 2003/0037999 | A1 | 2/2003 | Tanaka et al. |
| 2003/0127297 | A1 | 7/2003 | Smith et al. |
| 2003/0141154 | A1 | 7/2003 | Rancourt et al. |
| 2003/0213658 | A1 | 11/2003 | Baba |
| 2004/0031581 | A1 | 2/2004 | Herreid et al. |
| 2004/0045692 | A1 | 3/2004 | Redemske |
| 2004/0074712 | A1 | 4/2004 | Quaglia et al. |
| 2004/0084260 | A1 | 5/2004 | Hoyte et al. |
| 2004/0242363 | A1 | 12/2004 | Kohno et al. |
| 2005/0011628 | A1 | 1/2005 | Frait et al. |
| 2005/0150222 | A1 | 7/2005 | Kalish et al. |
| 2005/0183909 | A1 | 8/2005 | Rau, III et al. |
| 2005/0193976 | A1 | 9/2005 | Suzuki et al. |
| 2006/0076200 | A1 * | 4/2006 | Dessouki ............ F16D 65/0018 188/218 XL |
| 2006/0243547 | A1 | 11/2006 | Keller |
| 2007/0039710 | A1 | 2/2007 | Newcomb |
| 2007/0056815 | A1 | 3/2007 | Hanna et al. |
| 2007/0062664 | A1 | 3/2007 | Schroth et al. |
| 2007/0062768 | A1 | 3/2007 | Hanna et al. |
| 2007/0142149 | A1 | 6/2007 | Kleber |
| 2007/0166425 | A1 | 7/2007 | Utsugi |
| 2007/0235270 | A1 * | 10/2007 | Miskinis ............ F16D 65/0006 188/218 XL |
| 2007/0298275 | A1 | 12/2007 | Carter et al. |
| 2008/0099289 | A1 | 5/2008 | Hanna et al. |
| 2008/0185249 | A1 | 8/2008 | Schroth et al. |
| 2009/0032569 | A1 | 2/2009 | Sachdev et al. |
| 2009/0107787 | A1 | 4/2009 | Walker et al. |

FOREIGN PATENT DOCUMENTS

| | | |
|---|---|---|
| CN | 20051113784 A | 10/2005 |
| CN | 1757948 A | 4/2006 |
| CN | 2863313 Y | 1/2007 |
| DE | 24 46 938 | 4/1976 |
| DE | 2446938 A1 | 4/1976 |
| DE | 25 37 038 | 3/1977 |
| DE | 2537038 A1 | 3/1977 |
| DE | 19649919 A1 | 6/1998 |
| DE | 199 48 009 | 3/2001 |
| DE | 19948009 C1 | 3/2001 |
| DE | 60000008 T2 | 3/2002 |
| DE | 101 41 698 | 3/2003 |
| DE | 10141698 A1 | 3/2003 |
| DE | 102005048258.9 | 10/2005 |
| DE | 102005048258 A1 | 4/2006 |
| DE | 60116780 T2 | 11/2006 |
| EP | 0 205 713 | 12/1986 |
| EP | 0205713 A1 | 12/1986 |
| GB | 1230 274 | 4/1971 |
| GB | 1230274 | 4/1971 |
| GB | 2328952 | 3/1999 |
| JP | 57154533 | 9/1982 |
| JP | 57154533 A | 9/1982 |
| JP | 1126434 U1 | 8/1989 |
| JP | 05-104567 | 4/1993 |
| JP | 11342461 A | 12/1999 |
| JP | 2001512763 T | 8/2001 |
| JP | 2003214465 A | 7/2003 |
| JP | 2004011841 A | 1/2004 |
| KR | 20010049837 A | 6/2001 |
| WO | 9823877 A1 | 6/1998 |
| WO | WO 98/23877 | 6/1998 |

(56) References Cited

FOREIGN PATENT DOCUMENTS

| WO | 0136836 A1 | 5/2001 |
|---|---|---|
| WO | WO 01/36836 | 5/2001 |
| WO | 2007035206 A2 | 3/2007 |

OTHER PUBLICATIONS

Omar Dessouki, George Drake, Brent Lowe, Wen Kuei Chang, General Motors Corp: Disc Brake Squeal: Diagnosis & Prevention. 03NVC-224; Society of Automotive Engineer, Inc. 2002.
Z. Wu, C. Richter, L. Menon, A Study of Anodization Process During Pore Formation in Nanoporous Alumina Templates, Journal of the Electrochemical Society, vol. 154, 2007.
W.-J. Lee, M. Alhoshan, W.H. Smyrl, Titanium Dioxide Nanotube Arrays Fabricated by Anodizing Processes, Journal of the Electrochemical Society, vol. 153, 2006, pp. B499-B505.
I.V. Sieber, P. Schmuki, Porous Tantalum Oxide Prepared by Electrochemical Anodic Oxidation, Journal of the Electrochemical Society, vol. 152, 2005, pp. C639-C644.
H. Tanaka, A. Shimada, A. Kinoshita, In situ Measurement of the Diameter of Nanopores in Silicon During Anodization in Hydrofluoric Acid Solution, Journal of the Electrochemic.
L.G. Hector, Jr., S. Sheu, Focused Energy Beam Work Roll Surface Texturing Science and Technology, Journal of Materials Processing & Manufacturing Science, vol. 2, Jul. 1993.
P.N. Anyalebechi, Ungrooved Mold Surface Topography Effects on Cast Subsurface Microstructure, Materials Processing Fundamentals, TMS 2007, pp. 49-62.
F. Yigit, Critical Wavelengths for Gap Nucleation in Solidification—Part 1: Theoretical Methodology, Journal of Applied Mechanics, vol. 67, Mar. 2000, pp. 66-76.
P.N. Anyalebechi, Undulatory Solid Shell Growth of Aluminum Alloy 3003 as a Function of the Wavelength of a Grooved Mold Surface Topography, TMS 2007, pp. 31-47.
Dessouki et al., U.S. Appl. No. 10/961,813, Coulumb friction damped disc brake rotors, filed Oct. 8, 2004.
Hanna et al., U.S. Appl. No. 11/475,756, Bi-metal disc brake rotor and method of manufacturing, filed Jun. 27, 2006.
Schroth et al., U.S. Appl. No. 11/475,759, Method of casting components with inserts for noise reduction, filed Jun. 27, 2006.
Schroth et al., U.S. Appl. No. 12/025,967, Damped products and methods of making and using the same, filed Feb. 5, 2008.
Hanna et al., U.S. Appl. No. 11/440,916, Bi-metal disc brake rotor and method of manufacture, filed May 25, 2006.
Hanna et al., U.S. Appl. No. 11/554,234, Coulomb damped disc brake rotor and method of manufacturing, filed Oct. 30, 2006.
Walker et al., U.S. Appl. No. 11/926,798, Inserts with holes for damped products and methods of making and using the same, filed Oct. 29, 2007.
Hanna et al., U.S. Appl. No. 11/832,401, Damped product with insert and method of making the same, filed Aug. 1, 2007.
Kleber, et al., U.S. Appl. No. 11/848,732, Cast-in-place torsion joint, filed Aug. 31, 2007.
Hanna et al., U.S. Appl. No. 11/780,679, Method of manufacturing a damped part, filed Jul. 20, 2007.
Aase et al., U.S. Appl. No. 11/969,259, Method of forming casting with frictional damping insert, filed Jan. 4, 2008.
Hanna et al., U.S. Appl. No. 12/165,729, Method for securing an insert in the manufacture of a damped part, filed Jul. 1, 2008.
Hanna et al., U.S. Appl. No. 12/165,731, Product with metallic foam and method of manufacturing the same, filed Jul. 1, 2008.
Agarwal et al., U.S. Appl. No. 11/860,049, Insert with tabs and damped products and methods of making the same, filed Sep. 24, 2007.
Hanna et al., U.S. Appl. No. 12/174,163, Damped part, filed Jul. 16, 2008.
Hanna et al., U.S. Appl. No. 12/174,223, Method of casting damped part with insert, filed Jul. 16, 2008.
Hanna et al., U.S. Appl. No. 12/183,180, Casting noise-damped, vented brake rotors with embedded inserts, filed Jul. 31, 2008.
Hanna et al., U.S. Appl. No. 12/183,104, Low mass multi-piece sound damped article, filed Jul. 31, 2008.
Golden et al., U.S. Appl. No. 12/105,411, Insert with filler to dampen vibrating components, filed Apr. 18, 2008.
Hanna et al., U.S. Appl. No. 11/440,893, Rotor assembly and method, filed May 25, 2006.
Carter, U.S. Appl. No. 11/680,179, Damped automotive components with cast in place inserts and method of making same, filed Feb. 28, 2007.
Ulicny et al., U.S. Appl. No. 12/105,438, Filler material to dampen vibrating components, filed Apr. 18, 2008.
Hanna et al., U.S. Appl. No. 12/272,164, Surface configurations for damping inserts, filed Nov. 17, 2008.
Hanna et al., U.S. Appl. No. 12/145,169, Damped product with an insert having a layer including graphite thereon and methods of making and using the same, filed Jun. 24, 2008.
Xia, U.S. Appl. No. 12/858,596, Lightweight brake rotor and components with composite materials, filed Sep. 20, 2007.
Dessouki et al., U.S. Appl. No. 12/178,872, Friction damped brake drum, filed Jul. 24, 2008.
Sachdev et al., U.S. Appl. No. 11/832,356, Friction welding method and products made using the same, filed Aug. 1, 2007.
Chinese First Office Action; CN200510113784.X; Dated May 18, 2007; 19 pages.
Chinese Second Office Action; CN200510113784.X; Dated Feb. 15, 2008; 13 pages.
German Examination Report; DE102005048258.9-12; Dated Oct. 22, 2007; 8 pages.
Gerdemann, Steven J,; Titanium Process Technologies; Advanced Materials & Processes, Jul. 2001, pp. 41-43.
Mahoney, M. W. & Lynch S. P.; Friction-Stir Processing; 15 pages.
MPIF: All You Need to Know about Powder Metallurgy; http://www.mpif.org/IntroPM/intropm/asp?linkid=1; 8 pages.
Powder Metallurgy—Wikipedia article; http://en.wikipedia.org/wiki/Powder_metallurgy; 5 pages.
Sintering—Wikipedia article; http://en.wikipedia.org/wiki/Sintering; 2 pages.
Magnetorheological fluid—Wikipedia article; http:en/wikipedia.org/wiki/Magnetorheological_fluid.
PCT/US2008/087354 Written Opinion and Search Report; Date of Mailing: Aug. 3, 2009; 9 pages.
PCT/US2009/039839 Written Opinion and Search Report; Date of Mailing: Nov. 24, 2009; 7 pages.
PCT/US2009/048424 Written Opinion and Search Report; Date of Mailing: Dec. 28, 2009; 7 pages.
U.S. Appl. No. 12/328,989, filed Dec. 5, 2008; First Named Inventor: Patrick J. Monsere.
U.S. Appl. No. 12/420,259, filed Apr. 8, 2009; First Named Inventor: Michael D. Hanna.
U.S. Appl. No. 12/434,057, filed May 1, 2009; First Named Inventor: Chongmin Kim.
U.S. Appl. No. 12/436,830, filed May 7, 2009; First Named Inventor: James G. Schroth.
U.S. Appl. No. 12/489,901, filed Jun. 23, 2009; First Named Inventor: Michael D. Hanna.
U.S. Appl. No. 12/885,813, filed Sep. 20, 2010; First Named Inventor: Michael D. Hanna.

\* cited by examiner

DAMPED PART WITH INSERT

CROSS-REFERENCE TO RELATED APPLICATIONS

This application claims the benefit of U.S. Provisional Application No. 60/951,031, filed Jul. 20, 2007.

TECHNICAL FIELD

The field to which the disclosure generally relates includes damped parts with inserts and methods of making and using the same.

BACKGROUND

Parts subjected to vibration may produce unwanted or undesirable vibrations. Similarly, a part or component may be set into motion at an undesirable amplitude and for a prolonged period. For example, parts such as brake rotors, brackets, pulleys, brake drums, transmission housings, gears and other parts may undergo unwanted or undesirable vibrations, and may even produce noise that is transmitted into the passenger compartment of a vehicle. In an effort to reduce the generation of this noise and thereby its transmission into the passenger compartment, a variety of techniques have been employed, including the use of polymer coatings on engine parts, sound absorbing barriers, and laminated panels having physical elastic layers. The undesirable vibrations in parts or components may occur in a variety of other products including, but not limited to, sporting equipment, housing appliances, manufacturing equipment such as lathes, mill/grinding/drilling machines, earth moving equipment, and other non-automotive applications, and components that are subject to dynamic loads and vibration. These components may be manufactured through a variety of means including casting, machining, forging, die casting, extrusion, etc.

SUMMARY OF EXEMPLARY EMBODIMENTS OF THE INVENTION

One embodiment of the invention may include a product including a body portion including a first face and a frictional damping insert overlying the first face of the body portion. The body portion may include a second face overlying the insert. The insert may have a throughhole and a portion of the body portion may extend from the first face through the throughhole and the insert to the second face of the body portion.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
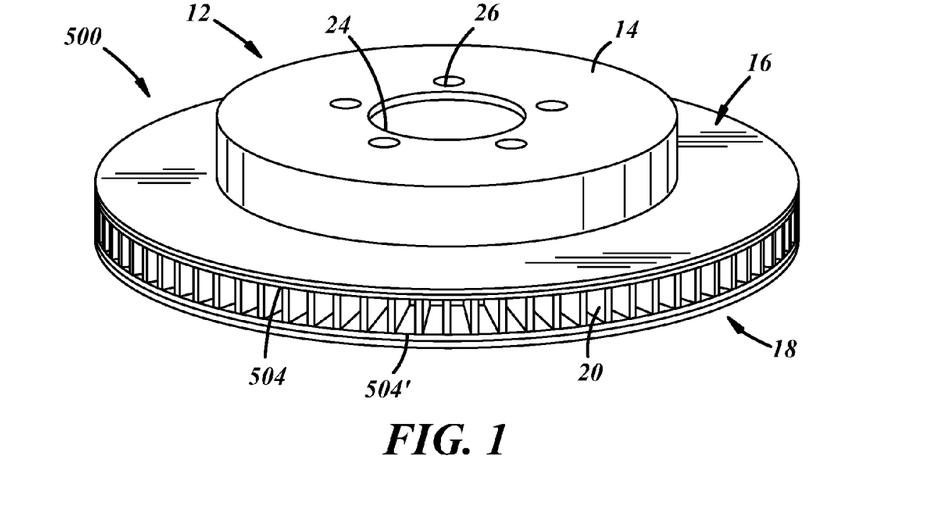
FIG. 1 is a perspective view illustrating a product according to one embodiment of the invention.

Referring now to FIG. 1, one embodiment of the invention may include a product 500 which may be, for example, a rotor assembly 12. The rotor assembly 12 may include a hub portion 14, a first annular rotor cheek 16 which may extend from the hub 14. A second annular rotor cheek 18 may be provided and spaced a distance from the first annular rotor cheek 16. A plurality of vanes 20 may extend between the first rotor cheek 16 and the second rotor cheek 18. A first frictional damping insert 504 may be positioned adjacent the first rotor cheek 16 or overlying the same. The plurality of vanes 20 may extend through throughholes formed in the first frictional damping insert 504. The vanes 20 may or may not be bonded to the insert 504. Optionally, a second frictional damping insert 504' may be provided, for example, adjacent the second rotor cheek 18 or underlying the same. The plurality of vanes 20 may also extend through associated throughholes formed in the second frictional damping insert 504'. In one embodiment, the hub portion 14 may include a central aperture 24. The hub portion 14 may also include a plurality of boltholes 26.

Figure 2:
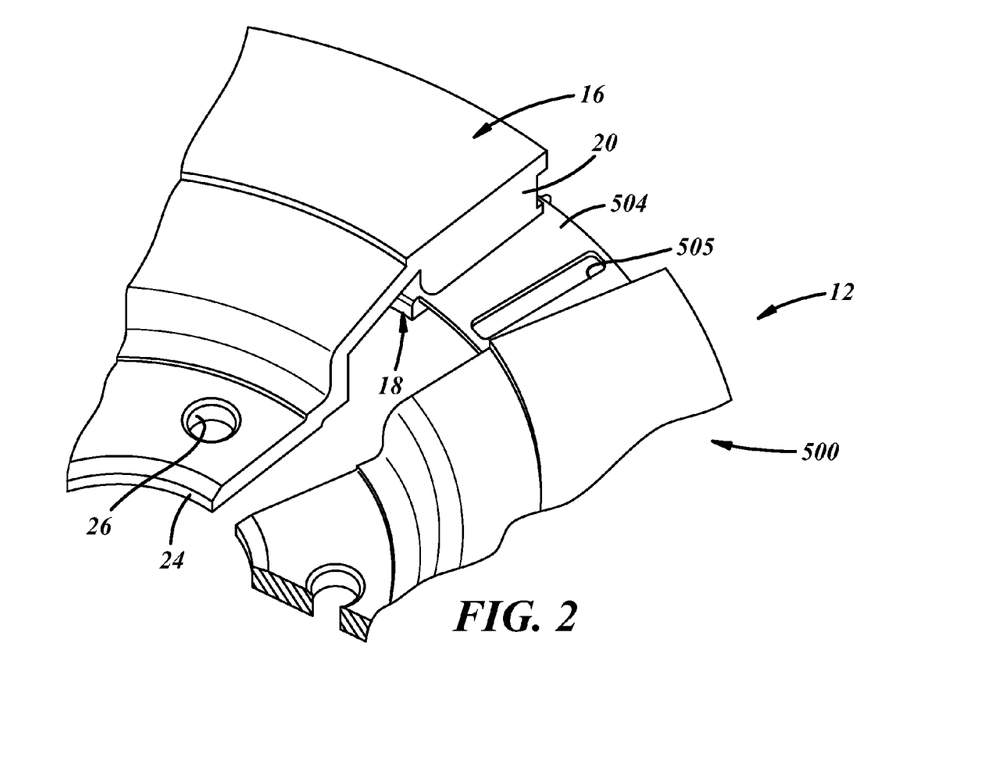
FIG. 2 is a perspective view with portions removed of a product according to one embodiment of the invention.
Figure 3:
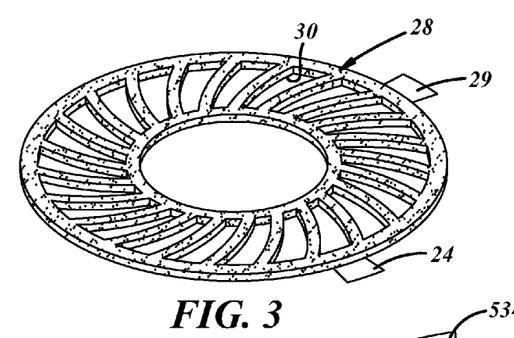
FIG. 3 is a perspective view illustrating a sacrificial core useful in making one embodiment of the invention.
Figure 4:
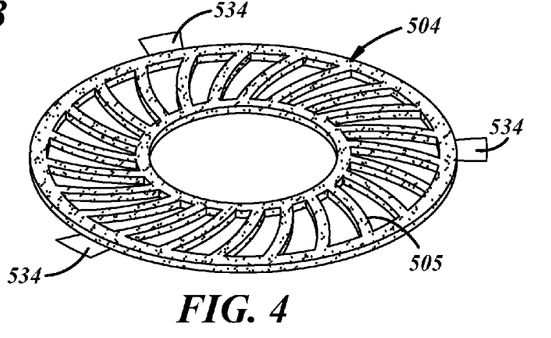
FIG. 4 is a perspective view illustrating one embodiment of an insert useful in one embodiment of the invention.

Referring now to FIG. 2, the frictional damping insert 504 may have slots 505 formed therein which may extend in a substantially perpendicular direction to an annular axis of the insert 504. Referring now to FIG. 3, the rotary assemblies 12 shown in FIGS. 1 and 2 may be manufactured utilizing a sacrificial casting core 28 which may include a plurality of slots 30 formed therein in a configuration to produce the vanes 20 such as those shown in FIG. 1 or 2. The slots 30 may be configured in any of a variety of geometries and are not limited to that shown in FIG. 3 or that necessary to produce the vane shown in either of FIG. 1 or 2. Referring now to FIG. 4, the rotary assembly 12 of FIG. 1 or 2 may be manufactured utilizing a friction damping insert 504 which may include a plurality of slots 505 formed therein in a configuration substantially identical to the slots 30 shown in the sacrificial casting core 28.

Figure 5:
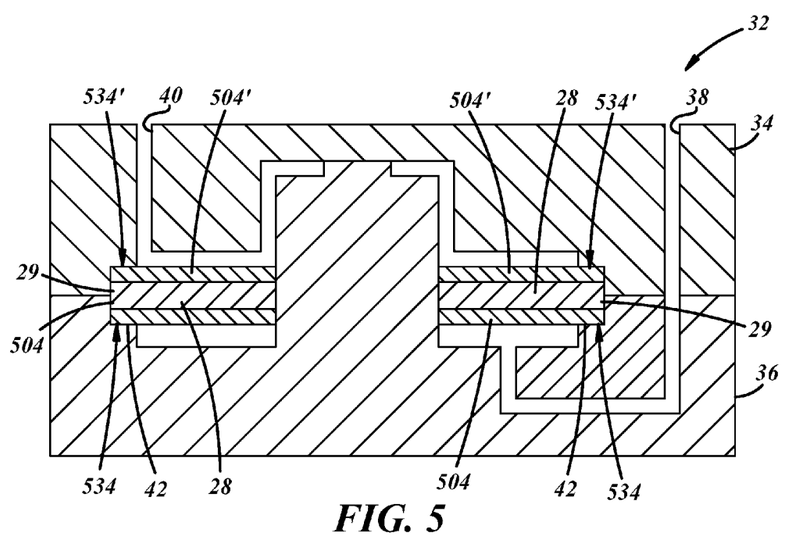
FIG. 5 illustrates a casting mold and process according to one embodiment of the invention.
Figure 6:
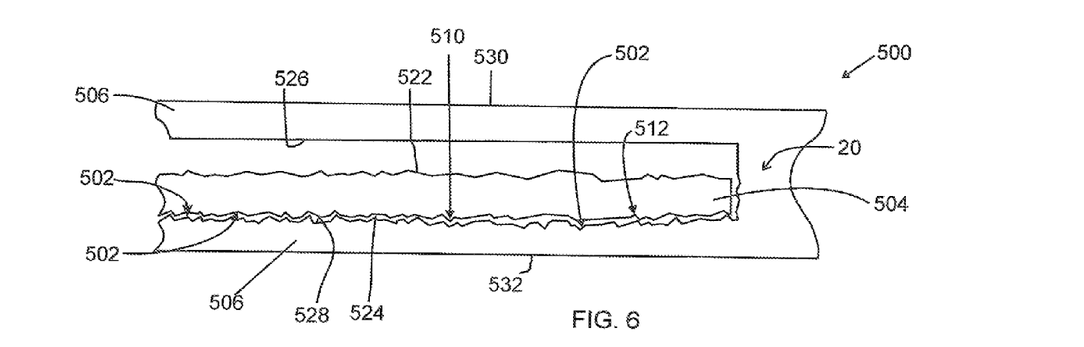
FIG. 6 is a sectional view with portions broken away of one embodiment of the invention including an insert.

Referring now to FIG. 5, the rotary assemblies 12 shown in FIG. 1 or 2 may be produced from a method including providing a mold 32 including a first portion 34 and a second portion 36. A molten material charge line 38 may be formed in the first portion 34 and second portion 36 of the mold 32. At least one of the first portion 34 or second portion 36 may include at least one vent line 40. The sacrificial casting core 28 may be placed in the mold 32 and a first frictional damping insert 504 may underlie the sacrificial casting core 28 and a second frictional damping insert 504' may optionally overlie the sacrificial casting core 28. The tabs 534 of the first frictional damping insert 504, the tabs 29 of the sacrificial casting core 28, and the tabs 534' of the second frictional damping insert 504 may rest on a seat 42 formed in the second mold portion 36. A molten material such as a metal may be charged into the mold 32 and allowed to solidify to form a product 500 such as a vehicle brake rotor having an insert 504 for frictional damping.

Referring to FIGS. 1-14, one embodiment of the invention includes a product or part 500 having a frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally damping a vibrating part. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the frictional movement of the surfaces 502 against each other. The frictional damping may occur due to the movement of a surface of the body 506 of the part and a surface of the insert 504 against each other and/or against the particles 514 or fibers, or by frictional movement of the particles 514 or fibers against each other or against remaining binder material.

In embodiments wherein the frictional surface 502 is provided as a surface of the body 506 or the insert 504 or a layer 520 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 504 may be an annular body and the area of frictional contact on a frictional surface 502 may extend in an annular direction a distance ranging from about 20 mm to about 1000 mm and in a transverse direction ranging from about 10 mm to about 75 mm. The frictional surface 502 may be provided in a variety of embodiments, for example, as illustrated in FIGS. 1-14.

Referring again to FIG. 6, in another embodiment of the invention one or more of the outer surfaces 522, 524 of the insert 504 or surfaces 526, 528 of the body 506 of the part 500 may include a relatively rough surface including a plurality of peaks 510 and valleys 512 to enhance the frictional damping of the part. In one embodiment, the surface of the insert 504 or the body 506 may be abraded by sandblasting, glass bead blasting, water jet blasting, chemical etching, machining or the like.

Figure 11:
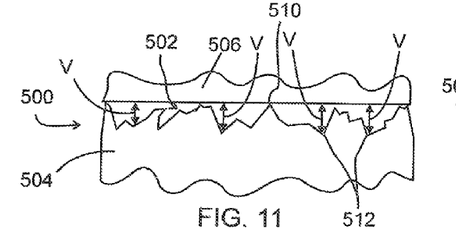
FIG. 11 is an enlarged sectional view with portions broken away of one embodiment of the invention.
Figure 12:
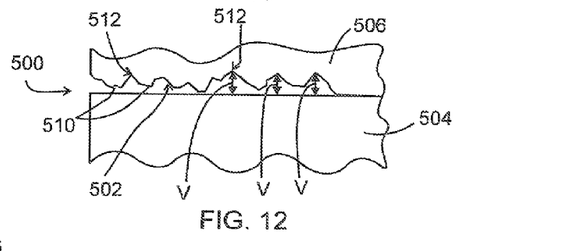
FIG. 12 is an enlarged sectional view with portions broken away of one embodiment of the invention.
Figure 13:
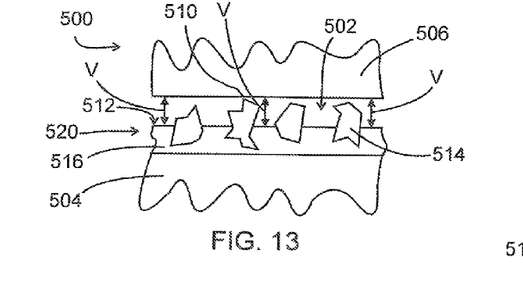
FIG. 13 is an enlarged sectional view with portions broken away of one embodiment of the invention.

As illustrated in FIGS. 11-13, the depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the opposing frictional surfaces 502 during component operation for frictional damping to occur.

Figure 9:
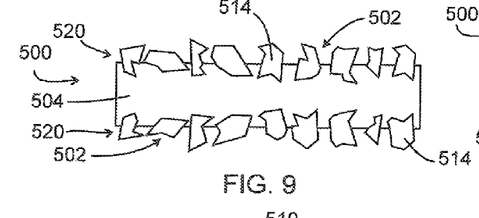
FIG. 9 is an enlarged view of an insert useful in one embodiment of the invention.
Figure 10:
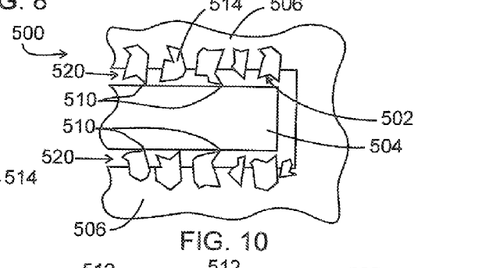
FIG. 10 is a sectional view with portions broken away of one embodiment of the invention.
Figure 14:
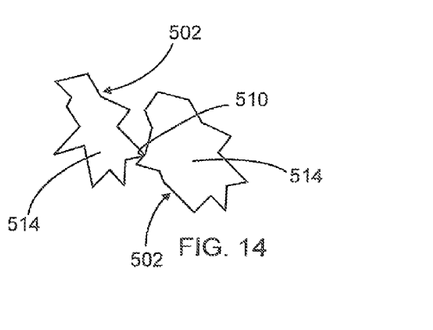
FIG. 14 illustrates particles useful in one embodiment of the invention.

In another embodiment of the invention the damping means or frictional surface 502 may be provided by particles 514 or fibers provided on at least one face of the insert 504 or a surface of the body 506 of the part 500. The particles 514 may have an irregular shape (e.g., not smooth) to enhance frictional damping, as illustrated in FIG. 14. One embodiment of the invention may include a layer 520 including the particles 514 or fibers which may be bonded to each other or to a surface of the body 506 of the part or a surface of the insert 504 due to the inherent bonding properties of the particles 514 or fibers. For example, the bonding properties of the particles 514 or fibers may be such that the particles 514 or fibers may bind to each other or to the surfaces of the body 506 or the insert 504 under compression. In another embodiment of the invention, the particles 514 or the fibers may be treated to provide a coating thereon or to provide functional groups attached thereto to bind the particles together or attach the particles to at least one of a surface of the body 506 or a surface of the insert 504. In another embodiment of the invention, the particles 514 or fibers may be embedded in at least one of the body 506 of the part or the insert 504 to provide the frictional surface 502 (FIGS. 9-10).

In embodiments wherein at least a portion of the part 500 is manufactured such that the insert 504 and/or the particles 514 or fibers are exposed to the temperature of a molten material such as in casting, the insert 504 and/or particles 514 or fibers may be made from materials capable of resisting flow or resisting significant erosion during the manufacturing. For example, the insert 504 and/or the particles 514 or fibers may include refractory materials capable of resisting flow or that do not significantly erode at temperatures above 1100° F., above 2400° F., or above 2700° F. When molten material, such as metal, is cast around the insert 504 and/or the particles 514, the insert 504 or the particles 514 should not be wet by the molten material so that the molten material does not bond to the insert 504 or layer 520 at locations wherein a frictional surface 502 for providing frictional damping is desired.

Illustrative examples of suitable particles 514 or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles 514 may have a length along the longest dimension thereof ranging from about 1 µm-350 µm, or 10 µm-250 µm.

Figure 8:
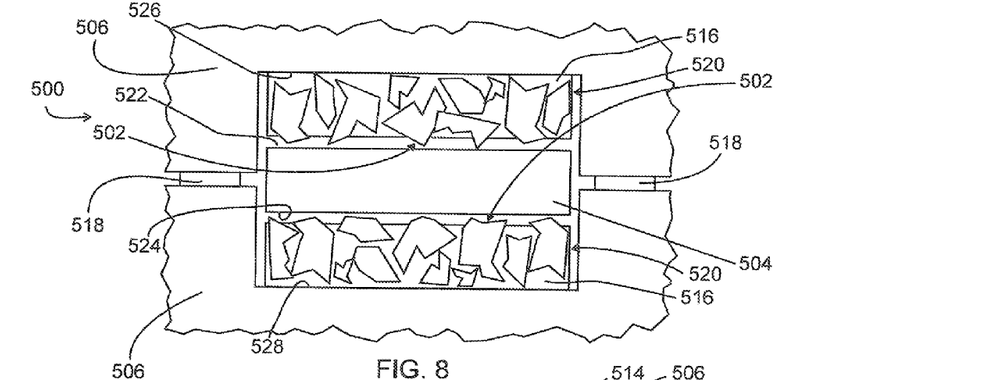
FIG. 8 is a sectional view with portions broken away of one embodiment of the invention.

In embodiments wherein the part 500 is made using a process wherein the insert 504 and/or the particles 514 or fibers are not subjected to relatively high temperatures associated with molten materials, the insert 504 and/or particles 514 or fibers may be made from a variety of other materials including, but not limited to, non-refractory polymeric materials, ceramics, composites, wood or other materials suitable for frictional damping. For example, such non-refractory materials may also be used (in additional to or as a substitute for refractory materials) when two portions of the body 506 of the part 500 are held together mechanically by a locking mechanism, or by fasteners, or by adhesives, or by welding 518, as illustrated in FIG. 8.

In another embodiment of the invention, the layer 520 may be a coating over the body 506 of the part or the insert 504. The coating may include a plurality of particles 514 which may be bonded to each other and/or to the surface of the body 506 of the part or the insert 504 by an inorganic or organic binder 516 (FIGS. 7-8, 13) or other bonding materials. Illustrative examples of suitable binders include, but are not limited to, epoxy resins, phosphoric acid binding agents, calcium aluminates, sodium silicates, wood flour, or clays. In another embodiment of the invention the particles 514 may be held together and/or adhered to the body 506 or the insert 504 by an inorganic binder. In one embodiment, the coating may be deposited on the insert 504 or body 506 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include Ironkote. In one embodiment, a liquid coating may be deposited on a portion of the insert and may include high temperature Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers.

When the layer 520 including particles 514 or fibers is provided over the insert 504 or the body 506 of the part the thickness L (FIG. 3) of the layer 520, particles 514 and/or fibers may vary. In various embodiments, the thickness L of the layer 520, particles 514 and/or fibers may range from about 1 µm-400 µm, 10 µm-400 µm, 30 µm-300 µm, 30 µm-40 µm, 40 µm-100 µm, 100 µm-120 µm, 120 µm-200 µm, 200 µm-300 µm, 200 µm-250 µm, or variations of these ranges.

In yet another embodiment of the invention the particles 514 or fibers may be temporarily held together and/or to the surface of the insert 504 by a fully or partially sacrificial coating. The sacrificial coating may be consumed by molten metal or burnt off when metal is cast around or over the insert 504. The particles 514 or fibers are left behind trapped between the body 506 of the cast part and the insert 504 to provide a layer 520 consisting of the particles 514 or fibers or consisting essentially of the particles 514 or fibers.

Figure 7:
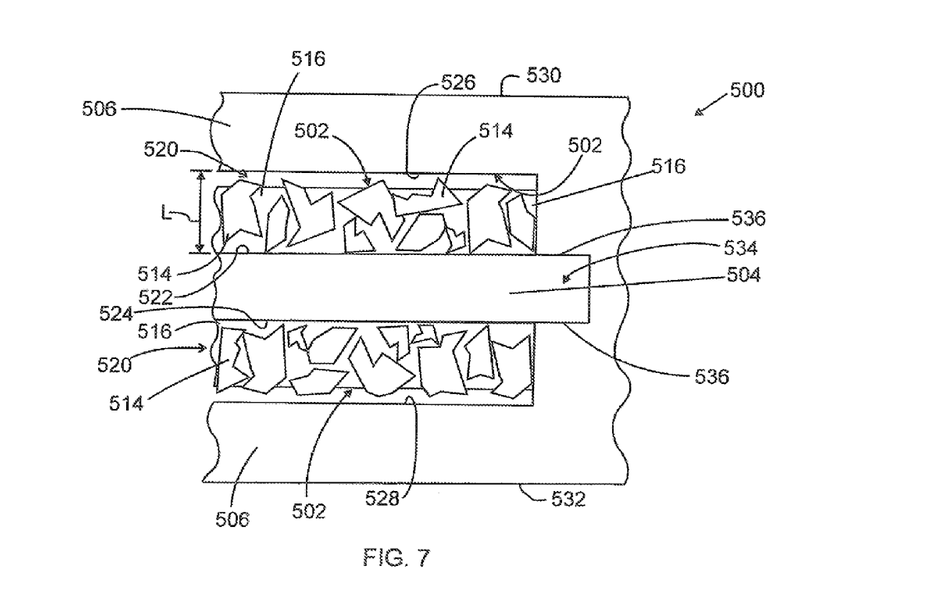
FIG. 7 is a sectional view with portions broken away of one embodiment of the invention including an insert having a layer thereon to provide a frictional surface for damping.

The layer 520 may be provided over the entire insert 504 or only over a portion thereof. In one embodiment of the invention the insert 504 may include a tab 534 (FIG. 7). For example, the insert 504 may include an annular body portion and a tab 534 extending radially inward or outward therefrom. In one embodiment of the invention at least one wettable surface 536 of the tab 534 does not include a layer 520 including particles 514 or fibers, or a wettable material such as graphite is provided over the tab 534, so that the cast metal is bonded to the wettable surface 536 to attach the insert 504 to the body 506 of the part 500 but still allow for frictional damping over the remaining insert surface which is not bonded to the casting.

In one embodiment of the invention at least a portion of the insert 504 is treated or the properties of the insert 504 are such that molten metal will not wet or bond to that portion of the insert 504 upon solidification of the molten metal. According to one embodiment of the invention at least one of the body 506 of the part or the insert 504 includes a metal, for example, but not limited to, aluminum, steel, stainless steel, cast iron, any of a variety of other alloys, or metal matrix composite including abrasive particles. In one embodiment of the invention the insert 504 may include a material such as a metal having a higher melting point than the melting point of the molten material being cast around a portion thereof.

In one embodiment the insert 504 may have a minimum average thickness of 0.2 mm and/or a minimum width of 0.1 mm and/or a minimum length of 0.1 mm. In another embodiment the insert 504 may have a minimum average thickness of 0.2 mm and/or a minimum width of 2 mm and/or a minimum length of 5 mm. In other embodiments the insert 504 may have a thickness ranging from about 0.1-20 mm, 0.1-6.0 mm, or 1.0-2.5 mm, or ranges therebetween.

Referring now to FIGS. 11-12, again the frictional surface 502 may have a plurality of peaks 510 and a plurality of valleys 512. The depth as indicated by line V of the valleys 512 may vary with embodiments. In various embodiments, the average of the depth V of the valleys 512 may range from about 1 µm-300 µm, 50 µm-260 µm, 100 µm-160 µm or variations of these ranges. However, for all cases there is local contact between the body 506 and the insert 504 during component operation for frictional damping to occur.

In other embodiments of the invention improvements in the frictional damping may be achieved by adjusting the thickness (L, as shown in FIG. 7) of the layer 520.

In one embodiment the insert 504 is not pre-loaded or under pre-tension or held in place by tension. In one embodiment the insert 504 is not a spring. Another embodiment of the invention includes a process of casting a material comprising a metal around an insert 504 with the proviso that the frictional surface 502 portion of the insert used to provide frictional damping is not captured and enclosed by a sand core that is placed in the casting mold. In one embodiment of the invention the layer 520 and/or insert 504 does not include or is not carbon paper or cloth.

Referring again to FIGS. 6-8, in various embodiments of the invention the insert 504 may include a first face 522 and an opposite second face 524 and the body 506 of the part may include a first inner face 526 adjacent the first face 522 of the insert 504 constructed to be complementary thereto, for example nominally parallel thereto. The body 506 of the part includes a second inner face 528 adjacent to the second face 524 of the insert 504 constructed to be complementary thereto, for example parallel thereto. The body 506 may include a first outer face 530 overlying the first face 522 of the insert 504 constructed to be complementary thereto, for example parallel thereto. The body 506 may include a first outer face 532 overlying the second face 524 of the insert 504 constructed to be complementary thereto, for example parallel thereto. However, in other embodiments of the invention the outer faces 530, 532 of the body 506 are not complementary to associated faces 522, 524 of the insert 504. In other embodiments the surfaces 526 and 528; 526 and 522; or 528 and 524 are mating surfaces but not parallel to each other.

When the term "over," "overlying," overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A product comprising:
a rotor assembly comprising a first rotor cheek comprising an inner face, a second rotor cheek comprising an inner face, a plurality of vanes extending from the inner face of the first rotor cheek to the inner face of the second rotor cheek, and a frictional damping insert having slots formed therein, the insert being interposed between the inner face of the first rotor cheek and the inner face of the second rotor cheek so that the vanes extend through the slots of the frictional damping insert, the frictional damping insert being constructed and arranged to dampen the rotor assembly.

2. A product as set forth in claim 1 further comprising frictional surfaces over at least one of the inner face of the first rotor cheek, the inner face of the second rotor cheek or the insert, wherein the frictional surfaces are constructed and arranged to move relative to each other and in frictional contact so that vibration of the rotor assembly is dissipated by frictional damping due to frictional movement of the frictional surfaces.

3. A product as set forth in claim 2 wherein the frictional surfaces comprise a layer comprising a plurality of particles or fibers over at least one of the inner face of the first rotor cheek, the inner face of the second rotor cheek or the insert.

4. A product as set forth in claim 2 wherein the frictional surfaces comprise a plurality of particles embedded in at least one of the inner face of the first rotor cheek, the inner face of the second rotor cheek, or the insert.

5. A product as set forth in claim 2 wherein the frictional surfaces comprise a coating comprising a plurality of particles or fibers over at least one of the inner face of the first rotor cheek, the inner face of the second rotor cheek or the insert.

6. A product as set forth in claim 2 wherein the frictional surfaces comprise a plurality of particles or fibers.

7. A product as set forth in claim 6 wherein the particles or fibers comprise at least one of silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles or fibers.

8. A product as set forth in claim 1 further comprising a second frictional damping insert having slots formed therein, the second frictional damping insert overlying the first frictional damping insert and being interposed between the inner face of the first rotor cheek and the inner face of the second rotor cheek and wherein the plurality of vanes extend through the slots of the second frictional damping insert.

9. A product as set forth in claim 1 wherein the vanes are not bonded to the first frictional damping insert.

10. A product as set forth in claim 1 wherein the vanes are bonded to the first frictional damping insert.

11. A product comprising:
a body portion comprising a first face and a second face, a frictional damping insert overlying the first face of the body portion and underlying the second face of the body portion, the insert having a throughhole and a portion of the body portion extending from the first face of the body portion through the throughhole of the insert to the second face of the body portion, and a layer of particles or fibers provided on at least one face of the frictional damping insert, wherein the layer of particles or fibers does not bond the frictional damping insert to the body portion.

12. A product as set forth in claim 11 wherein at least one of the first face or the second face of the body portion is spaced a distance from the insert so that a gap exists between at least one of the first face or the second face of the body portion and the insert.

13. A product as set forth in claim 11 wherein the layer of particles or fibers has a thickness ranging from about 1 μm to 400 μm.

14. A product as set forth in claim 11 wherein the body portion comprises a metal.

15. A product as set forth in claim 11 wherein the insert comprises a metal.

16. A product as set forth in claim 11 wherein the particles are embedded in the insert.

17. A product as set forth in claim 11 wherein the body portion comprises cast metal.

18. A product as set forth in claim 11 wherein the body portion comprises a first brake rotor cheek and a second brake rotor cheek and wherein the first face is a surface of the first brake rotor cheek and wherein the second face is a surface of the second brake rotor cheek.

19. A product as set forth in claim 11 wherein the particles or fibers comprise at least one of silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles or fibers.

20. A method comprising:
providing a mold including a first portion and a second portion, the mold being constructed to produce a rotor assembly comprising a first rotor cheek comprising an inner face, a second rotor cheek comprising an inner face, and a plurality of vanes extending from the inner face of the first rotor cheek to the inner face of the second rotor cheek;
placing a sacrificial casting core in the mold, the casting core having slots formed therein;
placing a first frictional damping insert in the mold overlying the sacrificial casting core, the first frictional damping insert having slots formed therein;
charging a molten material into the mold and solidifying the molten material; and
removing the sacrificial core to form the rotor assembly comprising a first rotor cheek comprising an inner face, a second rotor cheek comprising an inner face, and a plurality of vanes extending from the inner face of the first rotor cheek to the inner face of the second rotor cheek through the slots of the first frictional damping insert.

21. A method as set forth in claim 20 further comprising:
placing a second frictional damping insert in the mold underlying the sacrificial casting core, the second frictional damping insert having slots formed therein; and
removing the sacrificial core to form the rotor assembly comprising a first rotor cheek comprising an inner face, a second rotor cheek comprising an inner face, and a plurality of vanes extending from the inner face of the first rotor cheek to the inner face of the second rotor cheek through the slots of the first frictional damping insert and the second frictional damping insert.

22. A product as set forth in claim 2 wherein the frictional surfaces include a plurality of peaks and valleys and an average depth of the valleys is in a range of about 1 μm to 300 μm.

23. A product as set forth in claim 1 wherein at least one of the first face or second face provides a first frictional surface, and wherein the insert provides a second fictional surface wherein the first frictional surface and first frictional surface are constructed and arranged to move relative to each other and in frictional contact so that vibration of the body is dissipated by frictional damping due to frictional movement of the frictional surfaces.

\* \* \* \* \*